United States Patent [19]

Jou

[11] Patent Number: 5,714,100
[45] Date of Patent: Feb. 3, 1998

[54] PROCESS FOR MANUFACTURING A WHEEL OF A ROLLER SKATE

[76] Inventor: Long-Wen Jou, No. 15-12, Hai-Wei-Tzu Lane, Chung-Yang Rd., Chung-Ho Tsun, Lung-Ching Hsiang, Taichung Hsien, Taiwan

[21] Appl. No.: 752,623

[22] Filed: Nov. 19, 1996

[51] Int. Cl.⁶ .................. B29C 44/06; B29C 44/12; B29C 45/14
[52] U.S. Cl. .................. 264/46.6; 264/154; 264/263; 264/271.1; 264/328.1; 29/894.351
[58] Field of Search .................. 264/46.6, 154, 264/263, 271.1, 279.1, 328.1; 291/894.35, 894.351

[56] References Cited

U.S. PATENT DOCUMENTS

| | | | |
|---|---|---|---|
| 2,932,856 | 4/1960 | Rockoff | 264/46.7 |
| 4,040,670 | 8/1977 | Williams | 264/279.1 |
| 4,603,025 | 7/1986 | Landay et al. | 264/242 |
| 4,908,170 | 3/1990 | Kurimoto | 264/46.6 |
| 5,004,572 | 4/1991 | Kurimoto | 264/46.6 |
| 5,120,279 | 6/1992 | Rabe | 264/46.7 |

*Primary Examiner*—Allan R. Kuhns
*Attorney, Agent, or Firm*—Joseph W. Berenato, III

[57] ABSTRACT

A process for manufacturing a wheel of a roller skate with a hub and a wheel body fixed around the hub is disclosed. The wheel body has a soft inner portion which is mounted around the hub and a hard outer portion which is fixed around the soft inner portion. The process includes: connecting two ends of a rubber tube in order to form a molding loop; forming a radial hole in the molding loop; charging a foamable rubber material into the molding loop via the radial hole; allowing the foamable rubber material to foam and fill the molding loop in order to form the inner portion of the wheel body; mounting the molding loop around an outer periphery of the hub; and injection molding a rubber material in a mold in order to form the outer portion of the wheel body around the molding loop and the outer periphery of the hub and in order to melt the molding loop and interconnect the foamable rubber material and the outer portion.

4 Claims, 4 Drawing Sheets

PROCESS FOR MANUFACTURING A WHEEL OF A ROLLER SKATE

BACKGROUND OF THE INVENTION

1. Field of the Invention

This invention relates to a process for manufacturing a wheel of a roller skate, more particularly to a process for manufacturing a roller skate wheel which has a hub and a wheel body that is formed with a hard outer portion and a soft inner portion.

2. Description of the Related Art

A known wheel of a roller skate comprises a hub and a wheel body which has a soft inner portion that is mounted around the hub and a hard outer portion which is fixed around the soft inner portion in order to provide a good shock-absorbing effect to the wheel. Three sets of molds are required respectively to form the hub, the inner and outer portions of the wheel body during the manufacture of the wheel. Therefore, the manufacturing cost of the known roller skate wheel is high.

SUMMARY OF THE INVENTION

It is a main object of the present invention to provide a process for manufacturing a Wheel of a roller skate at a lower cost.

According to the present invention, there is disclosed a process for manufacturing a roller skate wheel which has a hub and a wheel body fixed around the hub. The wheel body has a soft inner portion which is mounted around the hub and a hard outer portion which is fixed around the soft inner portion. The process comprises the steps of:

connecting two ends of a rubber tube in order to form a molding loop;

forming a radial hole in the molding loop;

charging a foamable rubber material into the molding loop via the radial hole;

allowing the foamable rubber material to foam and fill the molding loop in order to form the inner portion of the wheel body;

mounting the molding loop around an outer periphery of the hub; and injection molding a rubber material in a mold in order to form the outer portion of the wheel body around the molding loop and the outer periphery of the hub and in order to melt the molding loop and interconnect the foamable rubber material and the outer portion.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 5:
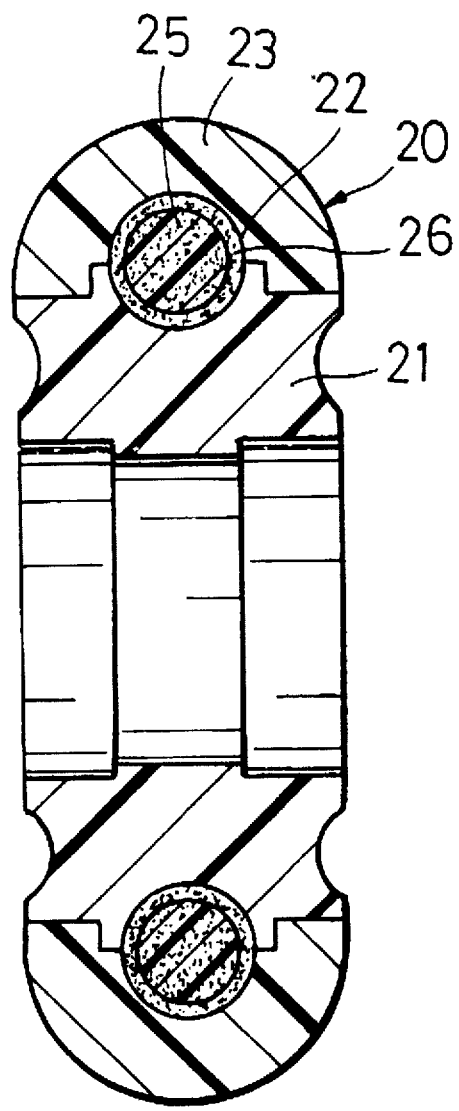
FIG. 5 is a sectional view of a roller skate wheel which is manufactured by the preferred embodiment of the process according to the present invention.

Referring to the drawings, a preferred embodiment of a process for manufacturing a wheel of a roller skate according to the present invention will be described hereinbelow. The wheel 20 has a hub 21 and a wheel body which has a soft inner portion 22 that is mounted around the hub 21 and a hard outer portion 23 that is fixed around the soft inner portion 22, as best illustrated in FIG. 5.

Figure 1:
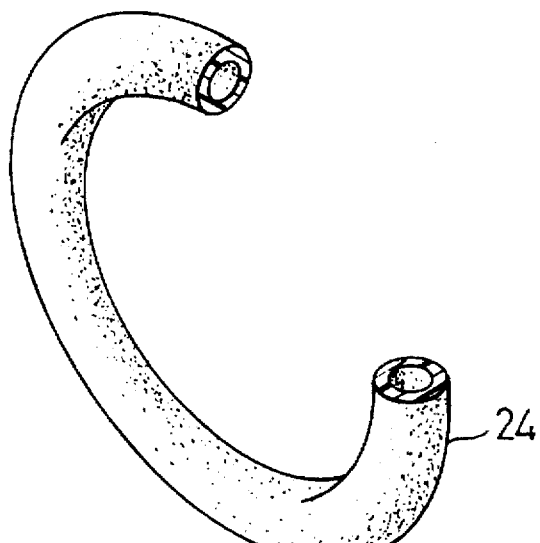
FIG. 1 is a perspective view of a rubber tube which is used to form a molding loop in a preferred embodiment of a process for manufacturing a wheel of a roller skate according to the present invention.
Figure 2:
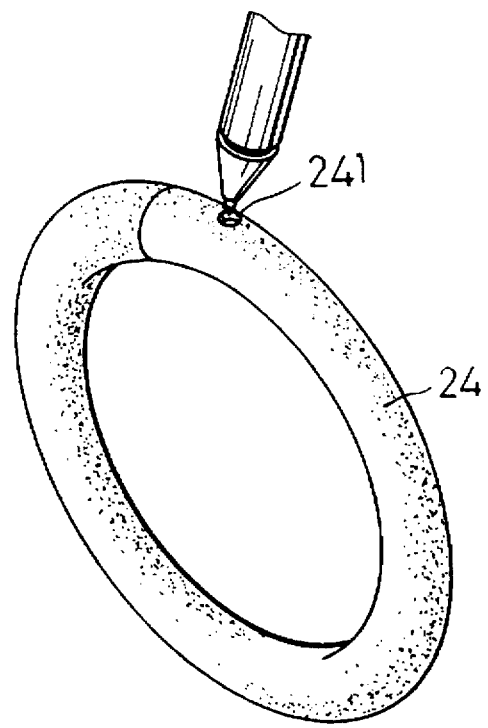
FIG. 2 is a schematic view illustrating how the inner portion of the wheel body of the wheel is formed in the process according to the present invention.
Figure 3:
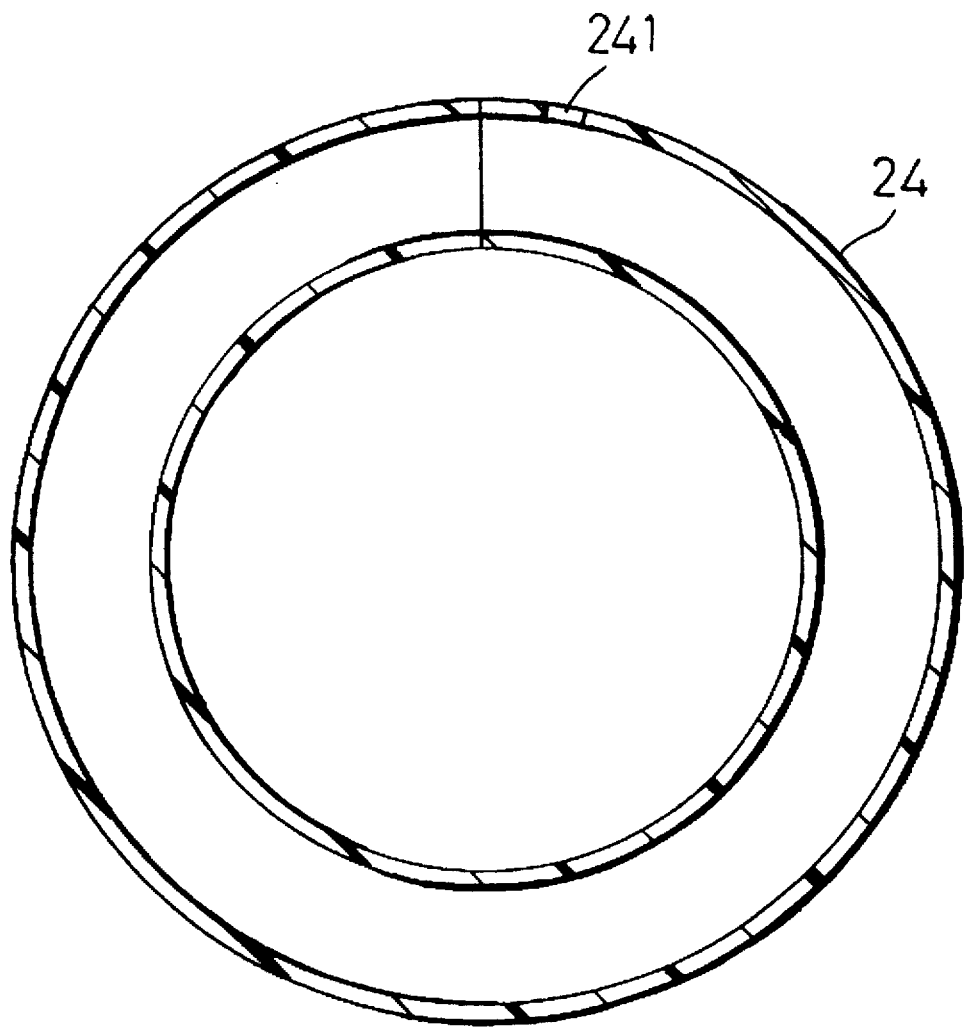
FIG. 3 is a sectional view of the molding loop of FIG. 2.
Figure 4:
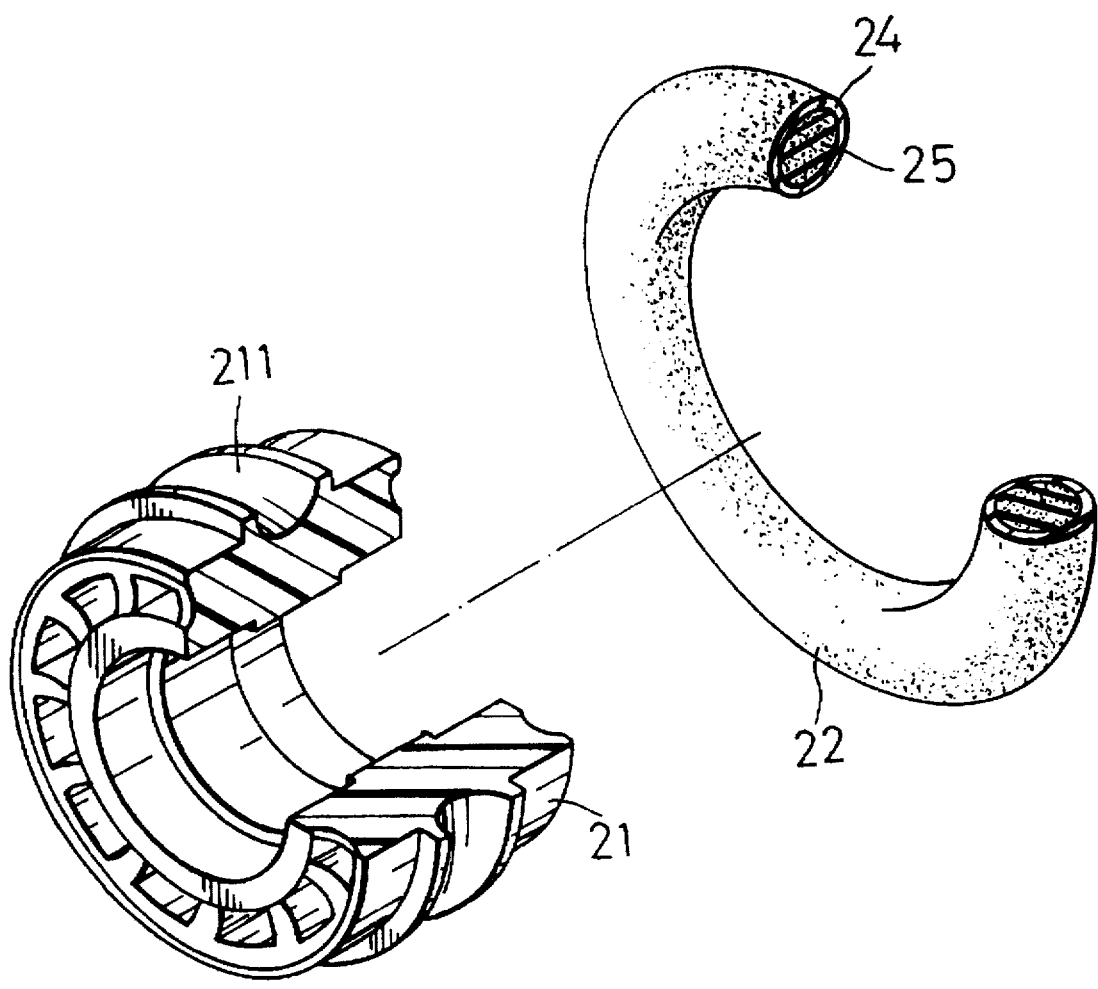
FIG. 4 is an exploded view of a hub and the molding loop which is to be mounted to the outer periphery of the hub according to the present invention.

Referring to FIGS. 3 and 4, two ends of a polyurethane rubber tube are heated and compressed to bind with each other in order to form a molding loop 24. A radial hole 241 is formed in the molding loop 24. A foamable polyurethane rubber material 25 is charged into the molding loop 24 via the radial hole 241, as best illustrated in FIG. 2. The foamable rubber material is then foamed and fills the molding loop 24, thereby forming the inner portion 22 of the wheel body, as best illustrated in FIG. 4 The molding loop 24 is sleeved around an outer periphery 211 of the hub 21 which is formed previously by means of a molding process. The hub 21, which has the molding loop 24 sleeved thereon, is disposed and heated in a mold (not shown) at a temperature of about 80° to 90° C. A molten polyurethane rubber material is injected into the mold by means of an injection molding machine (not shown) in order to form the outer portion 23 of the wheel body around the molding loop 24 and the outer periphery 211 of the hub 21. At this time, the molding loop 24 melts to form a film which interconnects firmly the foamable rubber material 25 and the polyurethane rubber material of the outer portion 23 after the inner and outer portions 22, 23 and the molding loop 24 are cooled.

It is noted that only two sets of molds are used to form the hub 21 and the outer portion 23 of the wheel body in the process for manufacturing the roller skate wheel according to the present invention. The inner portion 22 of the wheel body can be formed easily by means of the molding loop 24 at a lower cost as compared to the molding process employed in the prior art.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A process for manufacturing a wheel of a roller skate, said wheel having a hub and a wheel body fixed around said hub, said wheel body having a soft inner portion which is mounted around said hub and a hard outer portion which is fixed around said soft inner portion, said process comprising the steps of:

connecting two ends of a rubber tube in order to form a molding loop;

forming a radial hole in said molding loop;

charging a foamable rubber material into said molding loop via said radial hole;

allowing said foamable rubber material to foam and fill said molding loop in order to form said inner portion of said wheel body;

mounting said molding loop around an outer periphery of said hub; and injection molding a rubber material in a mold in order to form said outer portion of said wheel body around said molding loop and said outer periphery of said hub and in order to melt said molding loop and interconnect said foamable rubber material and said outer portion.

2. The process for manufacturing a wheel of a roller skate as claimed in claim 1, wherein said rubber tube is made of polyurethane rubber.

3. The process for manufacturing a wheel of a roller skate as claimed in claim 1, wherein said rubber material is polyurethane rubber.

4. The process for manufacturing a wheel of a roller skate as claimed in claim 1, wherein said foamable rubber material is foamable polyurethane rubber.

* * * * *